(12) United States Patent
Alexander et al.

(10) Patent No.: US 10,300,833 B2
(45) Date of Patent: May 28, 2019

(54) RESILIENT COVER CLIP

(71) Applicant: Dowco, Inc., Manitowoc, WI (US)

(72) Inventors: Jon Alexander, West Bend, WI (US); Justin Hough, Lebanon, MO (US)

(73) Assignee: Dowco, Inc., Manitowoc, WI (US)

(*) Notice: Subject to any disclaimer, the term of this patent is extended or adjusted under 35 U.S.C. 154(b) by 204 days.

(21) Appl. No.: 14/606,735

(22) Filed: Jan. 27, 2015

(65) Prior Publication Data

US 2015/0211556 A1 Jul. 30, 2015

Related U.S. Application Data

(60) Provisional application No. 61/933,184, filed on Jan. 29, 2014.

(51) Int. Cl.
| | |
|---|---|
| *B60P 7/04* | (2006.01) |
| *B60J 7/10* | (2006.01) |
| *F16B 2/22* | (2006.01) |
| *F16B 5/06* | (2006.01) |
| *F16B 5/12* | (2006.01) |
| *B63B 17/02* | (2006.01) |

(52) U.S. Cl.
CPC .............. *B60P 7/04* (2013.01); *B60J 7/104* (2013.01); *F16B 2/22* (2013.01); *F16B 5/0692* (2013.01); *F16B 5/126* (2013.01); *B63B 17/02* (2013.01); *Y10T 24/44026* (2015.01)

(58) Field of Classification Search
CPC ...... B60P 7/02; B60P 7/04; B60J 7/102; B60J 7/104; F16B 2/22; F16B 5/126; F16B 5/0692
See application file for complete search history.

(56) References Cited

U.S. PATENT DOCUMENTS

| | | |
|---|---|---|
| 559,506 A | 5/1896 | Swain |
| 2,732,877 A | 1/1956 | Taylor |
| 2,961,725 A | 11/1960 | McGee |
| 3,059,659 A | 10/1962 | Ipsen |
| 3,122,394 A | 2/1964 | Bryden |
| 3,172,419 A | 3/1965 | Lewis |
| 3,186,129 A | 6/1965 | Blood |
| 3,426,400 A | 2/1969 | Lauro |
| 3,572,353 A | 3/1971 | Pinkley |
| 3,574,367 A | 4/1971 | Jankowski |
| 3,654,648 A | 4/1972 | Wilhoit |
| 3,810,267 A | 5/1974 | Fussell et al. |

(Continued)

FOREIGN PATENT DOCUMENTS

| | | |
|---|---|---|
| GB | 2198396 | 6/1988 |
| GB | 270307 | 7/1988 |

OTHER PUBLICATIONS

Website screenshot; https://www.youtube.com/watch?v=RepAaag_wbQ; link to youtube video titled How to use Bennington's Quick Clip Mooring Cover; captured Feb. 20, 2015; published Jun. 10, 2013.

(Continued)

*Primary Examiner* — Abigail E Troy
(74) *Attorney, Agent, or Firm* — Shane Delsman; Godfrey & Kahn, S.C.

(57) ABSTRACT

A resilient clip can be used for covers for equipment. The resilient clip has a portion that can be inserted into a channel on the equipment, a portion that can be attached to a cover, and a portion that can be used to remove the clip from the channel.

28 Claims, 18 Drawing Sheets

(56) References Cited

U.S. PATENT DOCUMENTS

| | | | |
|---|---|---|---|
| 4,132,335 | A | 1/1979 | Ingram |
| 4,194,636 | A | 3/1980 | Byram et al. |
| 4,209,098 | A | 6/1980 | Adams |
| 4,273,278 | A | 6/1981 | Storm |
| 4,406,386 | A | 9/1983 | Rasor et al. |
| 4,596,105 | A | 6/1986 | Farmer |
| 4,639,033 | A | 1/1987 | Wheatley et al. |
| 4,754,905 | A | 7/1988 | Bott |
| 4,771,897 | A | 9/1988 | Ho |
| 4,863,082 | A | 9/1989 | Evans et al. |
| 4,869,378 | A | 9/1989 | Miller |
| 4,993,351 | A | 2/1991 | Zirkelbach et al. |
| 5,014,458 | A | 5/1991 | Wagner |
| 5,058,652 | A | 10/1991 | Wheatley et al. |
| 5,152,574 | A | 10/1992 | Tucker |
| 5,189,980 | A | 3/1993 | Zirkelbach et al. |
| 5,201,487 | A | 4/1993 | Epplett |
| 5,215,032 | A | 6/1993 | Ellis et al. |
| 5,322,296 | A | 6/1994 | Weimerskirch |
| 5,438,789 | A | 8/1995 | Emory |
| 5,577,856 | A | 11/1996 | Tezuka |
| 5,617,909 | A | 4/1997 | Duginske |
| 5,664,793 | A | 9/1997 | Engibarov |
| 5,706,753 | A | 1/1998 | Menne et al. |
| 5,743,204 | A | 4/1998 | Tweet |
| 5,768,966 | A | 6/1998 | Duginske |
| 5,839,388 | A | 11/1998 | Vadney |
| 5,970,904 | A | 10/1999 | Wellen et al. |
| 6,053,558 | A * | 4/2000 | Weldy ............. B60J 7/102 160/374.1 |
| 6,089,781 | A | 7/2000 | Kellberg |
| 6,152,312 | A | 11/2000 | Nava et al. |
| 6,227,505 | B1 | 5/2001 | Van Order et al. |
| 6,257,306 | B1 * | 7/2001 | Weldy ............. B60J 7/104 160/327 |
| 6,481,679 | B1 | 11/2002 | Bennett et al. |
| 6,561,117 | B1 | 5/2003 | Kell |
| 6,591,541 | B1 | 7/2003 | Cummings |
| 6,688,668 | B2 * | 2/2004 | Stevens ............. B60J 7/104 296/100.01 |
| 6,698,603 | B2 | 3/2004 | Lawson et al. |
| 6,837,661 | B2 | 1/2005 | Schwarz et al. |
| 6,871,749 | B2 | 3/2005 | Bostick et al. |
| 6,886,489 | B2 | 5/2005 | Zarn et al. |
| 6,895,887 | B2 | 5/2005 | Raiter |
| 7,255,511 | B2 | 8/2007 | Dolan |
| 7,341,231 | B2 | 3/2008 | Zarn |
| 7,380,383 | B2 | 6/2008 | Olofsson et al. |
| 7,401,995 | B2 | 7/2008 | Senakiewich, II |
| 7,448,523 | B2 | 11/2008 | Aftanas et al. |
| 7,517,117 | B2 | 4/2009 | Moreland et al. |
| 7,547,170 | B2 | 6/2009 | Womack et al. |
| 7,634,875 | B2 | 12/2009 | Genschorek |
| 7,669,723 | B2 | 3/2010 | Kao |
| 7,717,278 | B2 | 5/2010 | Kao |
| 8,070,378 | B2 | 12/2011 | Gargaro, III et al. |
| 2002/0106240 | A1 | 8/2002 | Johnson, Jr. |
| 2005/0067542 | A1 | 3/2005 | Zarn |
| 2006/0120797 | A1 | 6/2006 | Mortensen |
| 2006/0133893 | A1 | 6/2006 | Harashima et al. |
| 2010/0290931 | A1 | 11/2010 | Burnett et al. |

OTHER PUBLICATIONS

Website screenshot; http://www.boattest.com/boats/boat_video.aspx?ID=3035; BoatTest.com; captured Feb. 20, 2015; (prior art for purposes of prosecution).

Website screenshot; http://www.ebay.com/itm/HARRIS-KAYOT-FSH-230-PONTOON-BOAT-COVER-BURGUNDY-W-VENTS-MARINE-BOAT-/191343936000; ebay listing of Harris Kayot FSH 230 Pontoon Boat Cover Burgundy w/Vents Marine Boat; captured Feb. 20, 2015; date identified on tag Oct. 6, 2010.

Website screenshot; https://shop.pontoons.com/store/detail/259/playpen_storage_covers_miscellaneous_canvas/2002/j_clip_kit_b/; Premier Marine, Inc.; captured Feb. 20, 2015; (prior art for purposes of prosecution).

Website screenshot; http://www.crestliner.com/crestliner-legacy/; Crestliner Legacy; captured Feb. 20, 2015; date clip J-Hook introduced 2005.

Brochure and catalog for Harris Flotebote; vol. 4; Issue 1; 2013.

Photograph of Bennington Clip; 2015; (prior art for purposes of prosecution).

\* cited by examiner

RESILIENT COVER CLIP

CROSS REFERENCE TO RELATED APPLICATION

This application claims the benefit of U.S. Provisional Patent Application Ser. No. 61/933,184, filed Jan. 29, 2014, the disclosure of which is hereby incorporated by reference herein in its entirety for all purposes.

FIELD OF THE INVENTION

The present invention relates generally to the field of boat and marine accessories. More particularly, the present invention relates to the attachment and removal of accessories such as covers.

BACKGROUND

Marine vehicles require upkeep and maintenance. One example of such maintenance is the frequent activity of uncovering and covering a boat, such as before and after use. The industry standard for attaching covers to boats is round metal snaps. One problem with such snaps is that because snaps are typically made from metal, they corrode and/or get dented and deformed and thus become more difficult to use over time. For example, if the mating component of a snap gets corroded, dented and/or dinged, it can affect the snap's ability to mate with the corresponding snap on a cover or may even prevent the snap from disengaging from the corresponding snap on a cover. If the housing of the snap gets corroded, dented and/or dinged, the snap may be prevented from being moved along a channel of the boat to properly align with the corresponding snap on a cover. In either case, the snap can no longer perform its function. Snaps also have quite a small surface area in relation to the cover. Thus, over time, the cover may tear from the small surface area of the cover being exposed to high tensile forces when the cover is being put on the boat.

The difficulty in snapping a cover to a boat is further increased by the limits of access to the perimeter of the boat. Boat owners and users often cover and uncover their boats while the boat is in the dock or the water. This makes it difficult to walk around the boat to line up the cover with the snaps and exert a considerable amount of pressure to engage the snaps if they are not in pristine condition.

Another problem with snaps is that for fiberglass boats, holes must be drilled into the fiberglass for the corresponding snaps of a cover to be inserted and held thereby. The drilling of holes in fiberglass can result in cracking of the fiberglass and/or require significant and expensive repairs. This risk causes the installation of snaps on fiberglass boats to be expensive. Such installation is also time consuming.

Attaching and detaching of other covers, such as, for example, those used for shade on the tops of marine vehicles and enclosure curtains made from fabric and/or clear plastic to protect such vehicles from the wind and rain, are similarly burdensome and challenging. Further, the boating industry includes many recreational users. Recreational users may choose to leave such covers off entirely so as to avoid the frustration and time required to snap and unsnap the cover to the boat. This results in accelerated wear and damage to the boat.

As such, there is a need for an accessory attachment that is easy and quick to remove and attach to the boat and that does not become more burdensome to use over time. There is also a need for an accessory attachment that does not require drilling into the fiberglass of fiberglass boats to install.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In one embodiment, the invention provides a clip for use in attaching an accessory to a vehicle such as a boat. The clip includes a bulbous portion, a tab and an arm. The bulbous portion has a first and second side and is adapted to fit in a channel of a vehicle. The tab is connected to the first side of the bulbous portion and is adapted to be attached to a cover. The arm is connected to the second side of the bulbous portion and is located a distance away from the tab. When the distance between at least a portion of the tab and at least a portion of the arm is decreased, the bulbous portion is deformed and can be inserted and removed from the channel and when the arm is located a distance away from the tab, the bulbous portion is securely held within the channel.

In other embodiment, the invention provides a fastener attached to a sheet of material. The fastener includes a first arm and a second arm, each having a first end and a second end. The first end of the second arm is connected to the first end of the first arm. The second end of the first arm and the second end of the second arm are movable from a base position to a pinched position so as to reshape the engagement section for insertion into a channel of a vehicle.

In another embodiment, the invention provides a cover for a vehicle with a channel having an opening at least partially defined by protrusions. The cover includes a fabric sized and shaped to cover the vehicle and a plurality of clips attached to the fabric. Each of the plurality of clips includes a first arm with a first and second end and a second arm with a first and second end. The first end of the second arm is connected to the first end of the first arm. Each of the plurality of clips are movable between a first position in which the second end of the first arm and the second end of the second arm of one of the plurality of clips are pinched together and a second position in which the second end of the first arm and the second end of the second arm are not pinched together. When one of the plurality of clips is in the first position, the one of the plurality of clips can be inserted between the protrusions and into the channel. When one of the plurality of clips is in the second position, the one of the plurality of clips is secured within the channel by the protrusions.

In another embodiment, the invention provides a cover attachment system for a marine vehicle. The cover attachment system includes a rail configured to be attached to the marine vehicle, a channel within the rail having an opening formed at least in part by lips, and a number of compressible members. Each of the compressible members includes a channel end, a first arm and a second arm. One of the arms is attached to a cover. The channel end is compressed when the arms are compressed towards each other. When the channel end is compressed, the compressible member can be inserted at least partially through the opening and into the channel. The compressible member is retained by the lips when the compressible member is not compressed.

Other objects and advantages of the invention will become apparent hereinafter.

DETAILED DESCRIPTION

Figure 1:
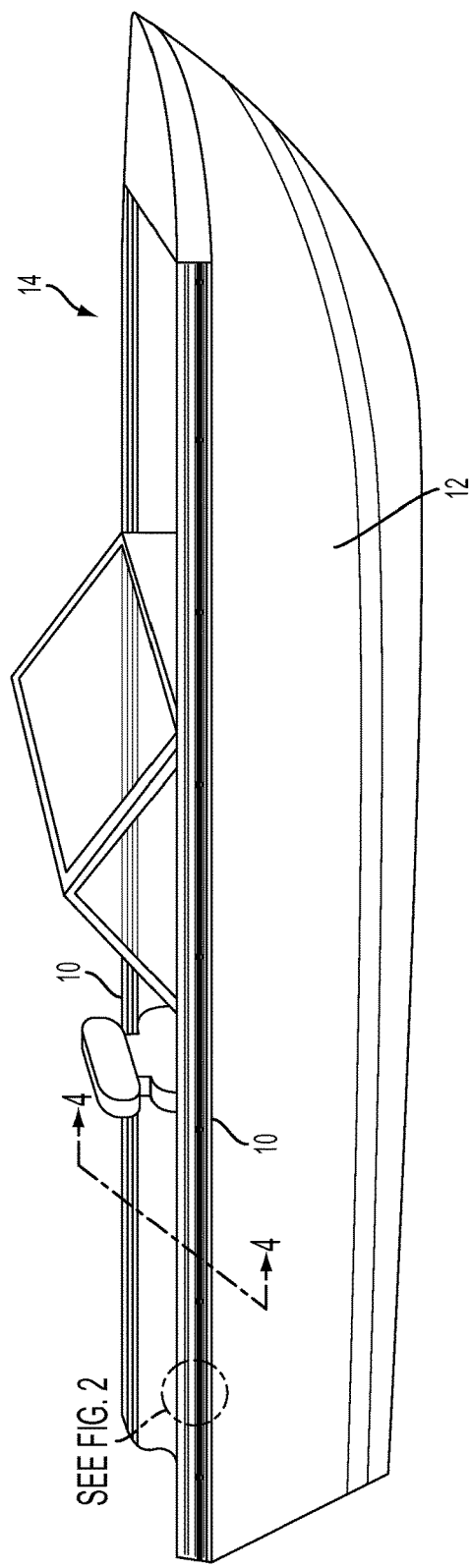
FIG. 1 is an isometric side view of a boat.
Figure 2:
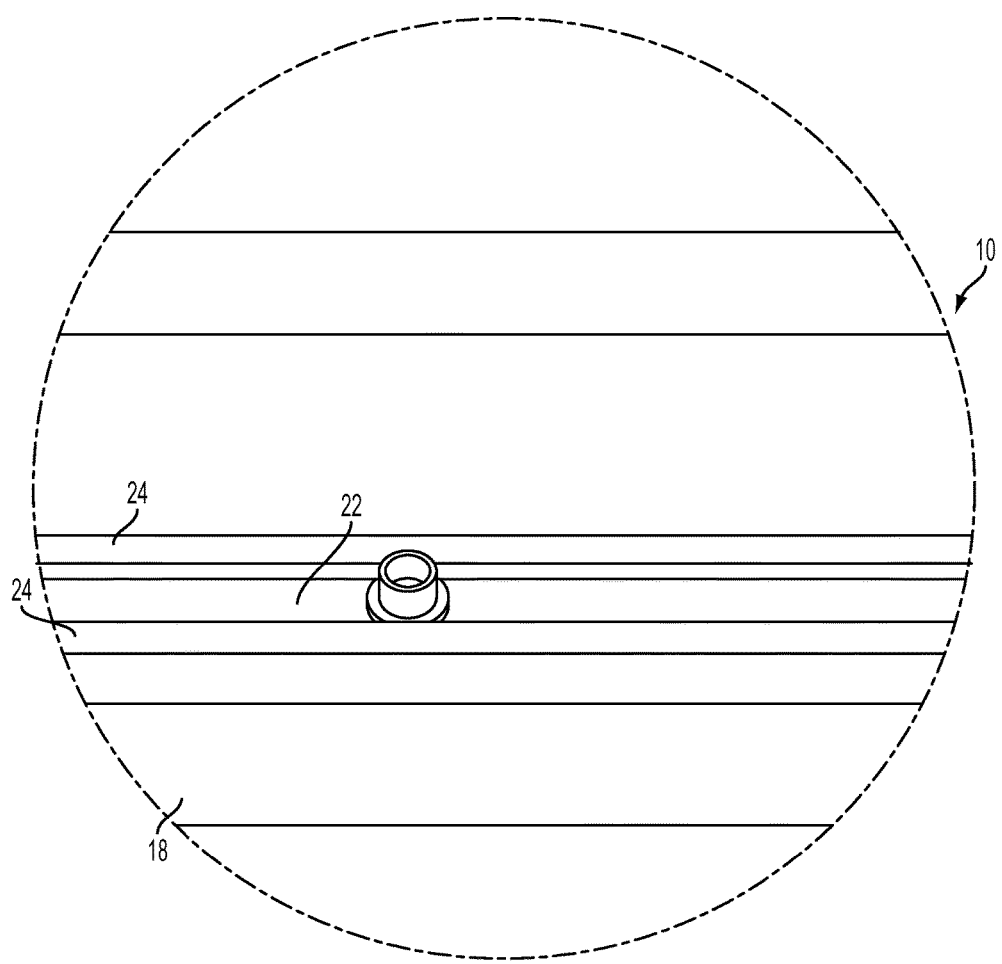
FIG. 2 is an enlarged view of a portion of the gunnel rail of FIG. 1.

Marine vehicles of all types use channels to attach various accessories to the vehicle. For example, a gunnel rail 10 can be attached to each side of a hull 12 for a boat 14, as seen in FIG. 1. Such a gunnel rail 10 could be used to attach a cover to the boat 14 or accessories such as beverage or tool holders. An enlarged portion of the gunnel rail 10 can be more clearly seen in FIG. 2.

Figure 3:
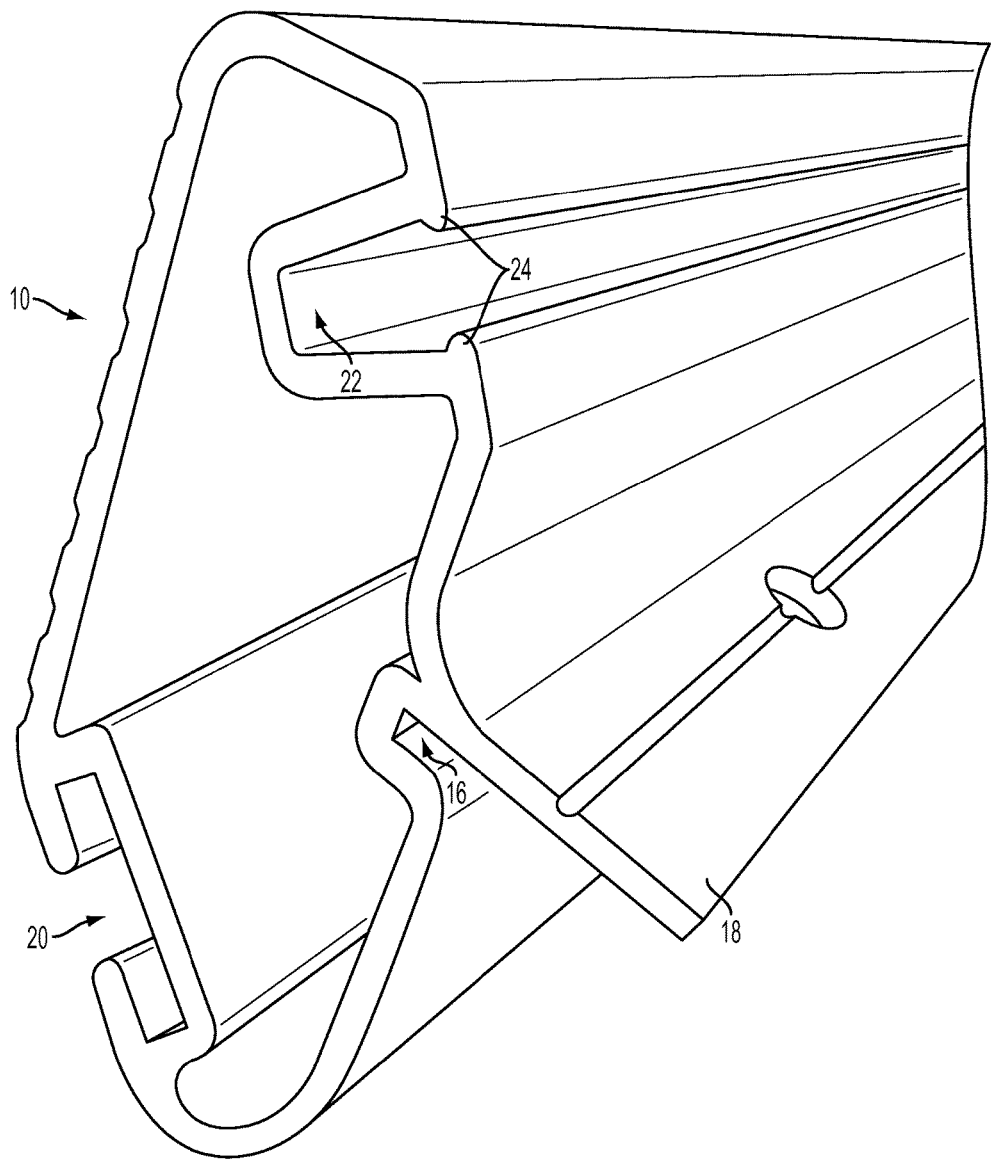
FIG. 3 is an end view of an extrusion of the gunnel rail in FIG. 1.

One type of extruded gunnel rail 10 can be seen in FIG. 3. The gunnel rail 10 illustrated in FIG. 3 includes a hull recess 16 and hull guide 18 for securing the gunnel rail to the boat frame, an interior channel 20 for attaching accessories for use inside the boat 14 and an exterior channel 22 typically used for attaching accessories to the exterior of the boat. In the embodiment shown in FIG. 3, the exterior channel 22 includes constrictions 24 to help the exterior channel retain the attachment portion of an accessory within the exterior channel such as a snap for a cover.

Figure 4:
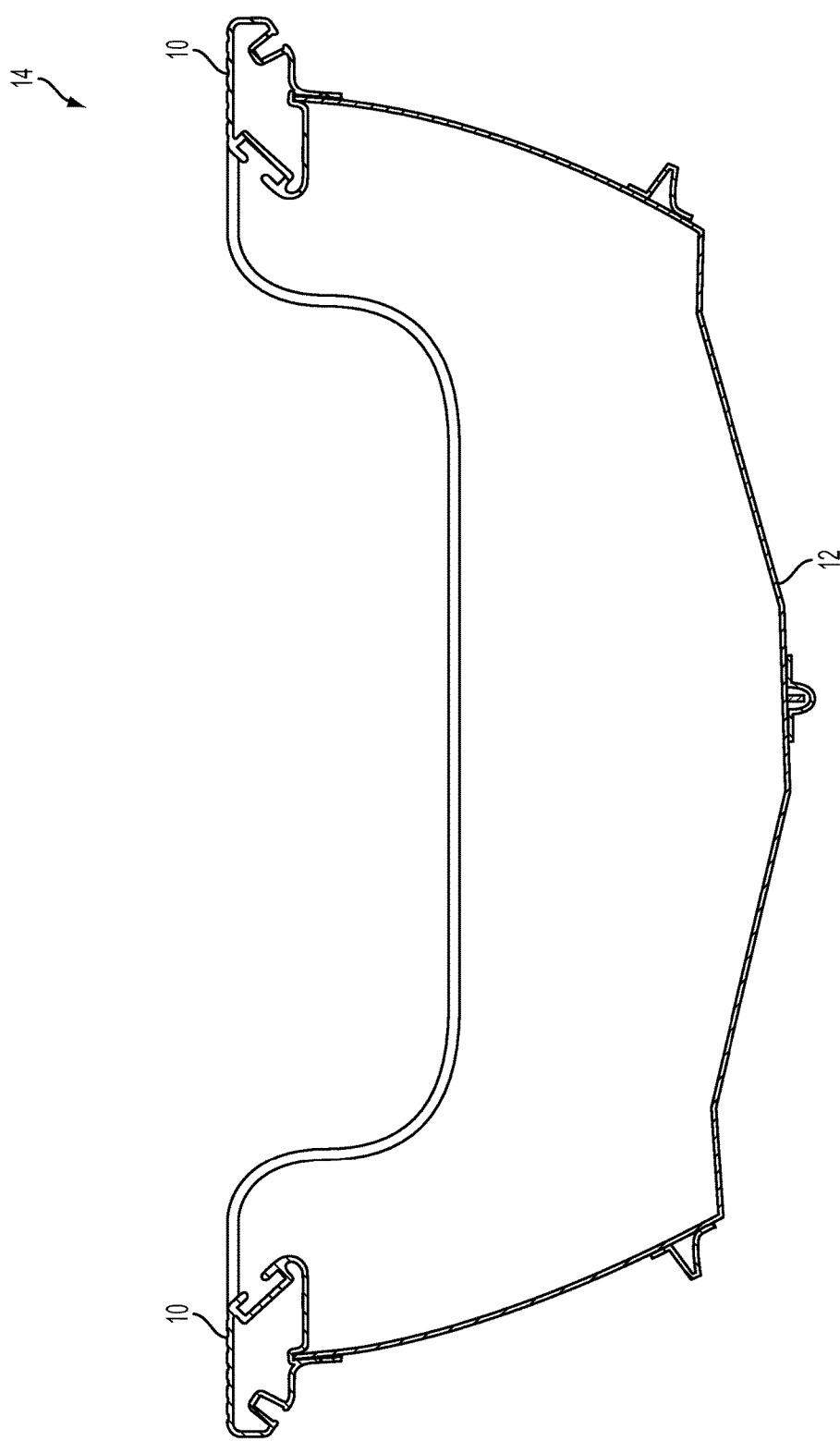
FIG. 4 is a cross-sectional view of the boat of FIG. 1 taken along the line 4-4 in FIG. 1.

As seen in FIG. 4, the gunnel rail 10 is attached to the boat 14 by inserting one side of the hull 12 into the hull recess 16 of the gunnel rail. The hull recess 16 and the hull guide 18 of the gunnel rail 10 help secure the gunnel rail to the boat 14 and properly orient the gunnel rail with respect to the hull 12. Once inserted, the hull 12 can be secured to the gunnel rail 10 such as by welding or bolting. Other means for securing a hull 12 to a gunnel rail 10 are known in the industry, the use of which would not defeat the spirit of the invention.

Figure 5:
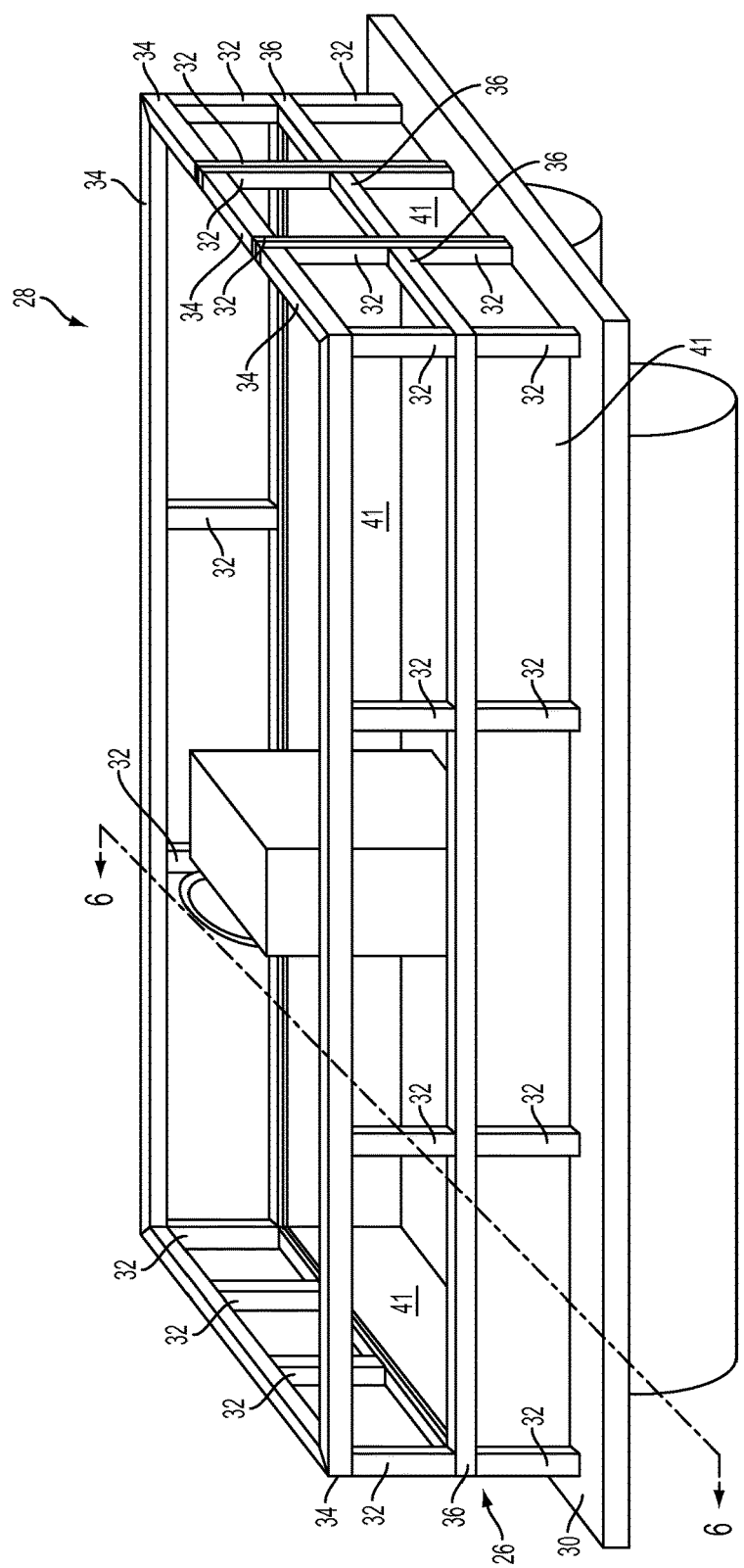
FIG. 5 is an isometric side view of a pontoon boat.
Figure 6:
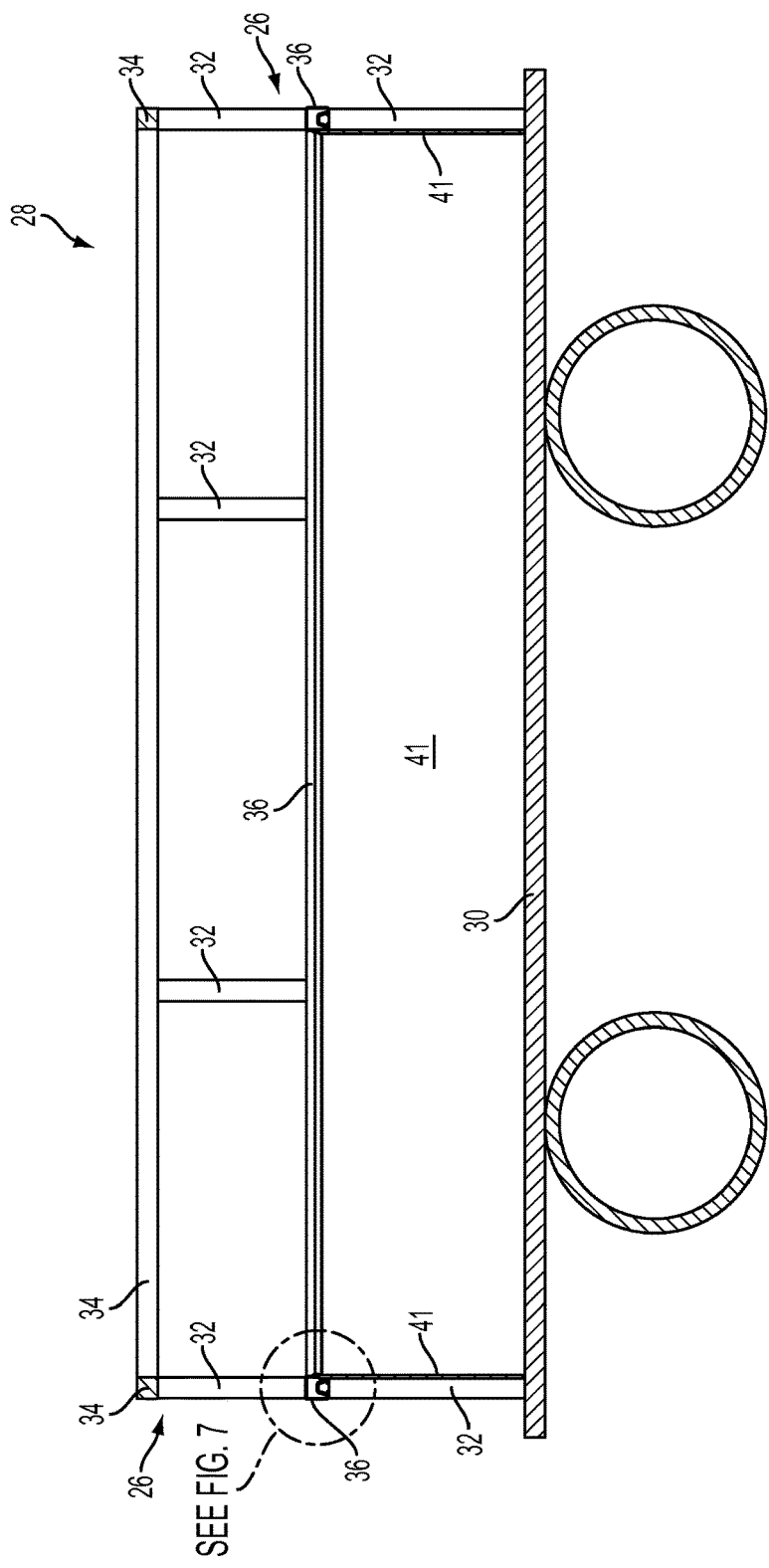
FIG. 6 is a cross-sectional view of the pontoon boat of FIG. 5 taken along the line 6-6 in FIG. 5.

By way of another example, a rail 26 or fence can be attached to a pontoon boat 28 such as by securing the rail to the platform 30 of the pontoon boat as is seen in FIG. 5. In the fence embodiment illustrated in FIG. 5, a number of vertical posts 32 are connected to the platform 30 of the pontoon boat 28. The vertical posts 32 are connected to each other by horizontal railings. In the example shown in FIGS. 5-6, the vertical posts 32 are connected by a top rail 34 and a mid rail 36.

Figure 7:
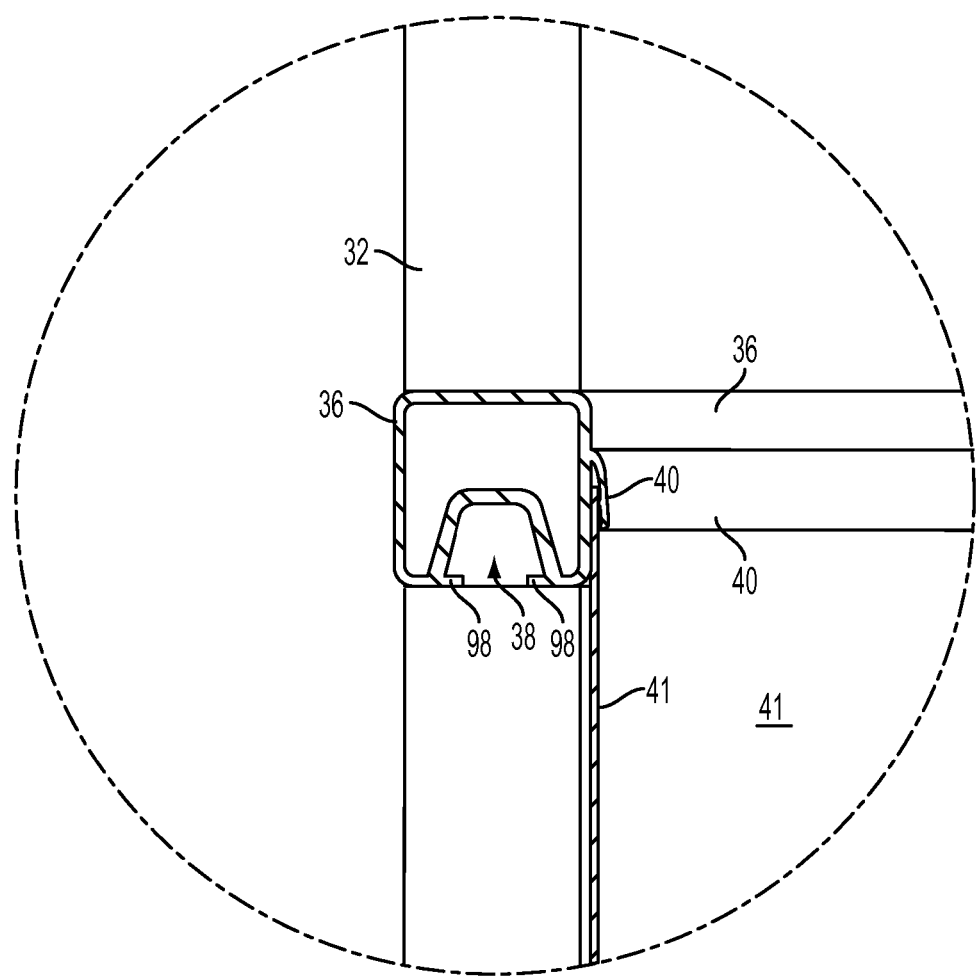
FIG. 7 is an enlarged view of a portion of the fence of FIG. 6.

As seen in the embodiment shown in FIG. 7, the mid rail 36 includes a channel 38 and a skirt leg 40. The skirt leg 40 can be used to hold a decorative skirt 41 that enhances the physical appearance of the pontoon boat 28 and helps prevent items inside the pontoon boat from falling into the water. The skirt leg 40 can securely hold the skirt 41 by being crimped to the skirt, welded or other such means known in the industry. The skirt leg 40 is typically positioned on the exterior side of the mid rail 36, such that the skirt appears on the exterior side of the rail and hides the structural components of the rail 26. In the embodiment shown in FIGS. 5-7, the skirt leg 40 is positioned on the interior side of the mid rail 36 in order to provide access to a channel 38 for attaching accessories to the exterior of the pontoon boat 28, such as a cover.

Typically, covers are secured to marine vehicles by installing metal snaps into a channel such as the exterior channel 22. Then corresponding snaps attached to the cover are mated with the snaps in the channel. This process is tedious, time consuming and frustrating for all of the reasons previously described.

In order to overcome such limitations, the present invention relates to compressible members such as clips or fasteners that can be securely held by a large variety of channels exiting in current rails and fences of marine vehicles in use today.

Figure 8:
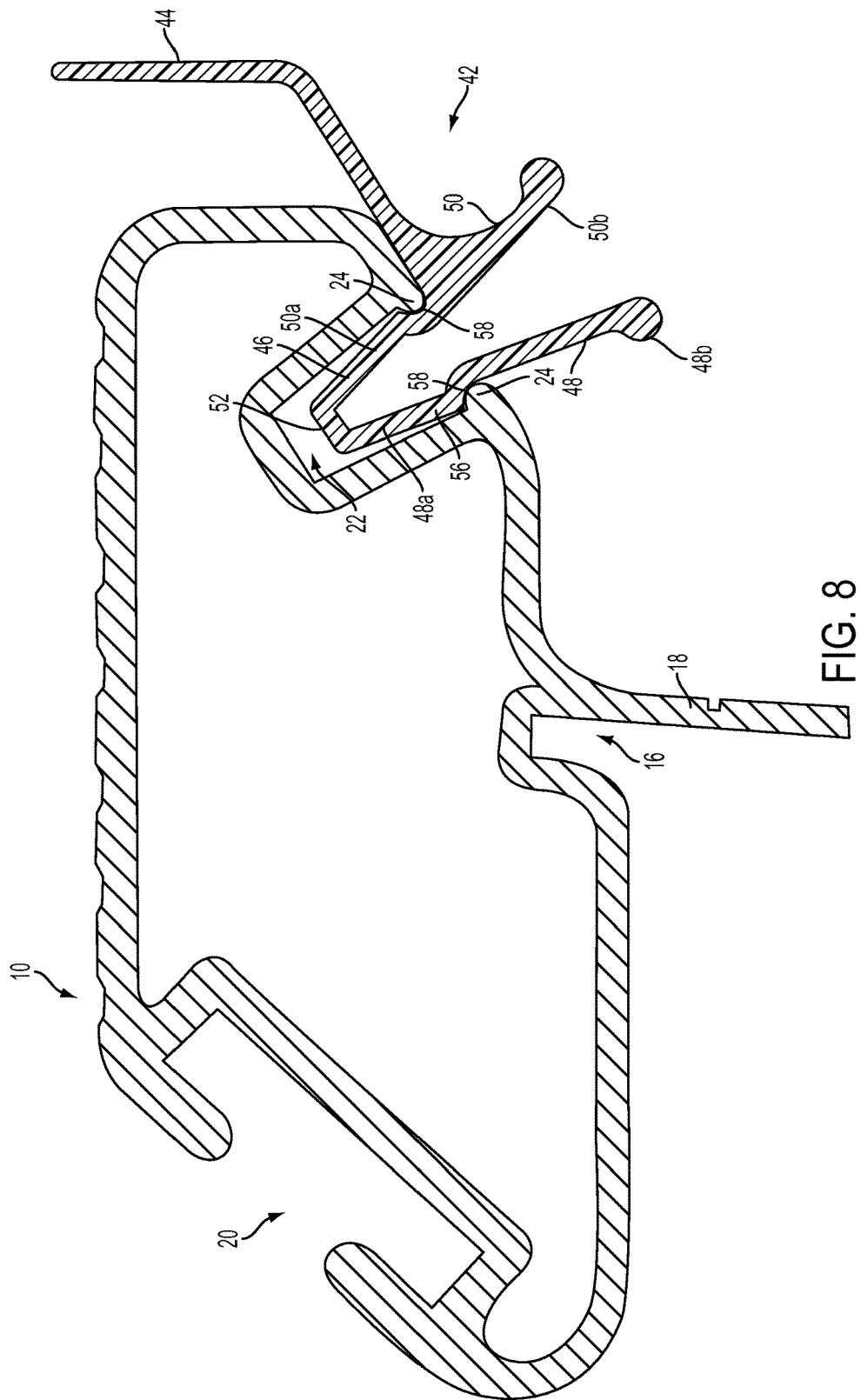
FIG. 8 is a cross-sectional view of a clip engaged in a rail.

For example, FIG. 8 shows one embodiment of such a clip. The clip 42 shown in FIG. 8 includes a flag, tab or leg 44 for attaching the clip to a substrate such as a fabric or plastic, a channel end or bulbous portion 46 for securing the clip within a channel, and two arms 48, 50 or prongs for removing the clip from the channel. The clip 42 can be attached to the substrate by sewing the substrate to the flag 44 of the clip. Other means for attaching a substrate are known in the industry, for example, thermal welding, gluing, riveting, etc., the use of which will not defeat the spirit of the invention. Further, the clip 42 could similarly be used to attach bow covers, tops and other enclosures and accessories.

Figure 9:
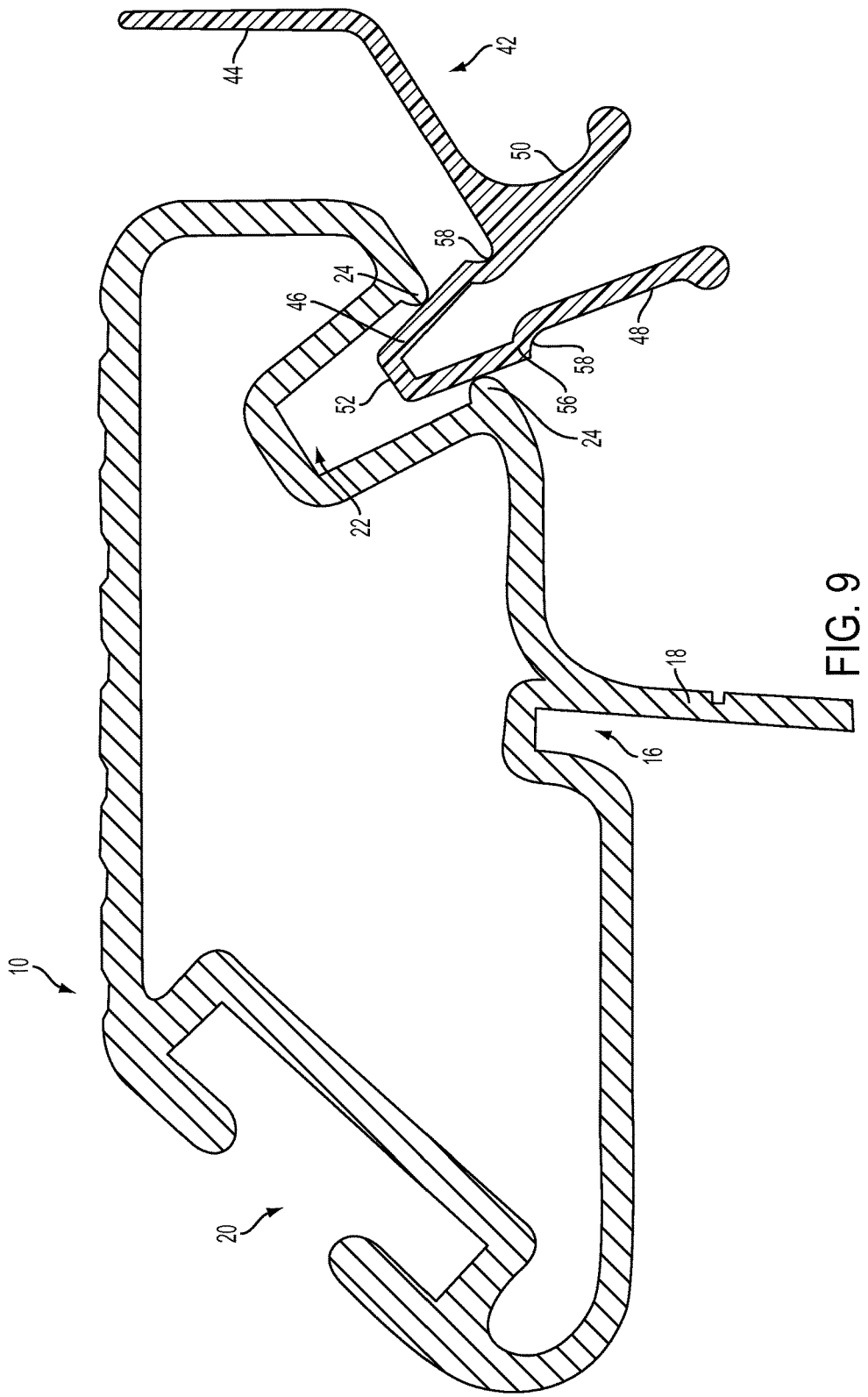
FIG. 9 is a cross-sectional view of the clip from FIG. 8 partially inserted in the rail from FIG. 8.

In the embodiment shown in FIGS. 8-9, the first end 48a, 50a of the first and second arms 48, 50 are connected at the channel end or engagement section 46 and diverge at the second end or handles 48b, 50b of the first and second arms. The channel end 46 can be shaped such that it can be easily inserted into the exterior channel 22. For example, in the clip 42 shown in FIGS. 8-9, the channel end 46 is a wedge shape. The wedge shape allows the channel end 46 to be easily inserted into the exterior channel 22 because a first end or side 52 of the channel end 46 is smaller than the exterior channel and the opening to the channel formed by the constrictions or lips 24. The insertion of the channel end 46 requires less precision than perfectly lining up a snap with its mating counterpart and is therefore, easier and less time consuming and burdensome.

In one embodiment, the clip 42 is sized and shaped such that the channel end 46 must compress to fit between the constrictions 24 in the exterior channel 22 of the gunnel rail 10 as most clearly seen in FIG. 9. One way to compress or deform the channel end 46 is by pinching, compressing or contracting the arms 48, 50 together to reduce the distance there between. Once the channel end 46 has passed through the constrictions 24, the channel end can decompress inside the exterior channel 22 as seen in FIG. 8 into its first or base position. When compressed, the clip 42 is in its second or pinched position. In the embodiment shown in FIGS. 8-9, the clip 42 includes grooves 58 behind the channel end. When properly inserted into the exterior channel 22, the grooves or recesses 58 interlock with the constrictions 24 to securely hold the clip 42 in place and prevent premature dislodging while the remaining clips are installed. The recesses 58 can also be used to provide a clicking sound and/or feel to indicate to the installer of the clip 42 that the clip is properly seated.

The second end or side 56 of the wedge shaped channel end 46 can be generally about the size of the exterior channel 22 or slightly smaller. If the second end 56 of the channel end 46 is smaller than the size of the exterior channel 22, the clip 42 will exert an outward force on the exterior channel as the clip tries to decompress to its original size, but is restrained from so doing by the size of the exterior channel. This outward force assists the clip 42 in remaining within and from being undesirably withdrawn from the exterior channel 22.

The clips 42 can be attached to the perimeter of a cover material at determined intervals to allow a user to insert the clips into the exterior channel 22 around the perimeter of the boat 14 while standing inside or outside the boat. As progress is made around the perimeter, more of the boat 14 becomes covered until ultimately the entire boat is covered.

As clips 42 are inserted into the exterior channel 22, the cover for a boat or other vehicle will begin to become taught. In the embodiment shown in FIGS. 8-9, the flag 44 is connected to one arm 50 of the clip 42 such that as the taught cover pulls on the flag, a portion of the second arm 50 is pulled a greater distance away from a portion of the first arm 48. This causes the clip 42 to be more securely held within the exterior channel 22. The cover can be even further tightened by tenting the cover with poles or a strap mechanism if desired.

When it is desired to remove the cover, a user can pinch the arms 48, 50, in the embodiment shown in FIGS. 8-9, thereby disengaging the grooves or concavities 58 from the constrictions 24 of the exterior channel 22. The clip 42 can then be easily pulled out of the exterior channel 22. Even if the cover is over tightened thereby making the second arm 50 difficult to move, the first arm 48 can still be moved towards the second arm quite easily to remove the clip 42 from the exterior channel 22. As more clips 42 are removed from the exterior channel 22, the remaining clips engaged in the exterior channel become easier to remove.

The main body of the clip can be made from a resilient material, such as via an extruded plastic that allows for a desired amount of flexibility, spring and/or resilience. The continuous extrusion can then be trimmed at specified intervals to provide the proper length of the clip. The clip or portions thereof may also be injection molded or created utilizing a co-extrusion process to achieve desired material properties at select locations. The flexibility, resilience and/or spring of the plastic from which the clip is made allows for a desired amount of compression and pinching to occur and for the clip to return to its original shape when no forces are acting upon it.

Figure 10:
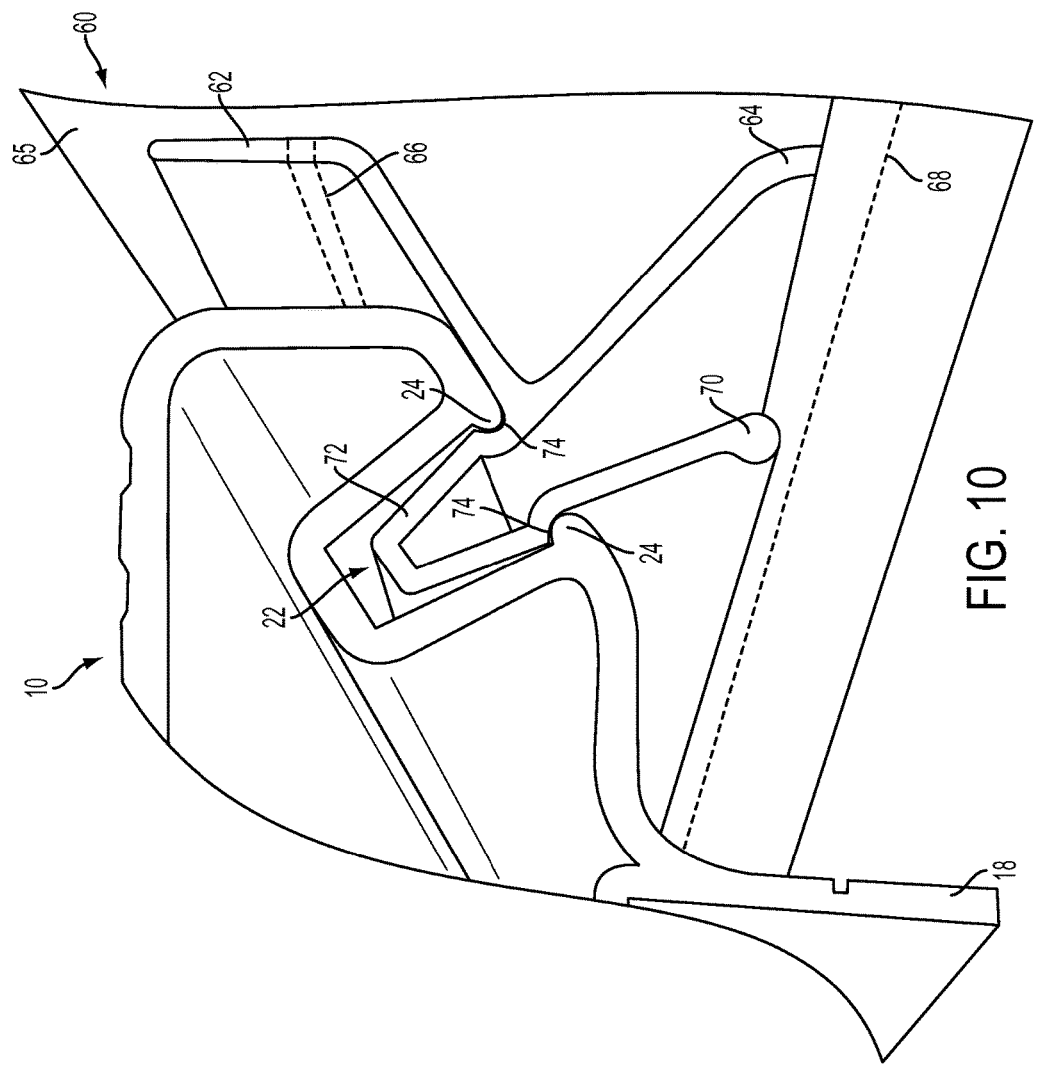
FIG. 10 is a perspective view of a clip connected to a cover engaged in a rail.

In another embodiment of a clip seen in FIG. 10, the clip 60 has a first flag 62 and a second flag 64. The first and second flags 62, 64 are secured to a cover material 65 by stitching 66, 68. The clip 60 also has an arm 70. When it is desired to remove the clip 60 from an exterior channel 22, the arm 70 is moved towards the second flag 64, thereby decreasing the distance between them, to compress or deform the channel end 72. The compression of the channel end 72 causes the recesses 74 to disengage from the constrictions 24 and allows the clip 60 to be withdrawn from the exterior channel 22. Further, when the taught cover pulls on one or both of the flags 62, 64, the arm 70 is pulled a greater distance away from the flag to more securely hold the clip 60 within the exterior channel 22.

Figure 11:
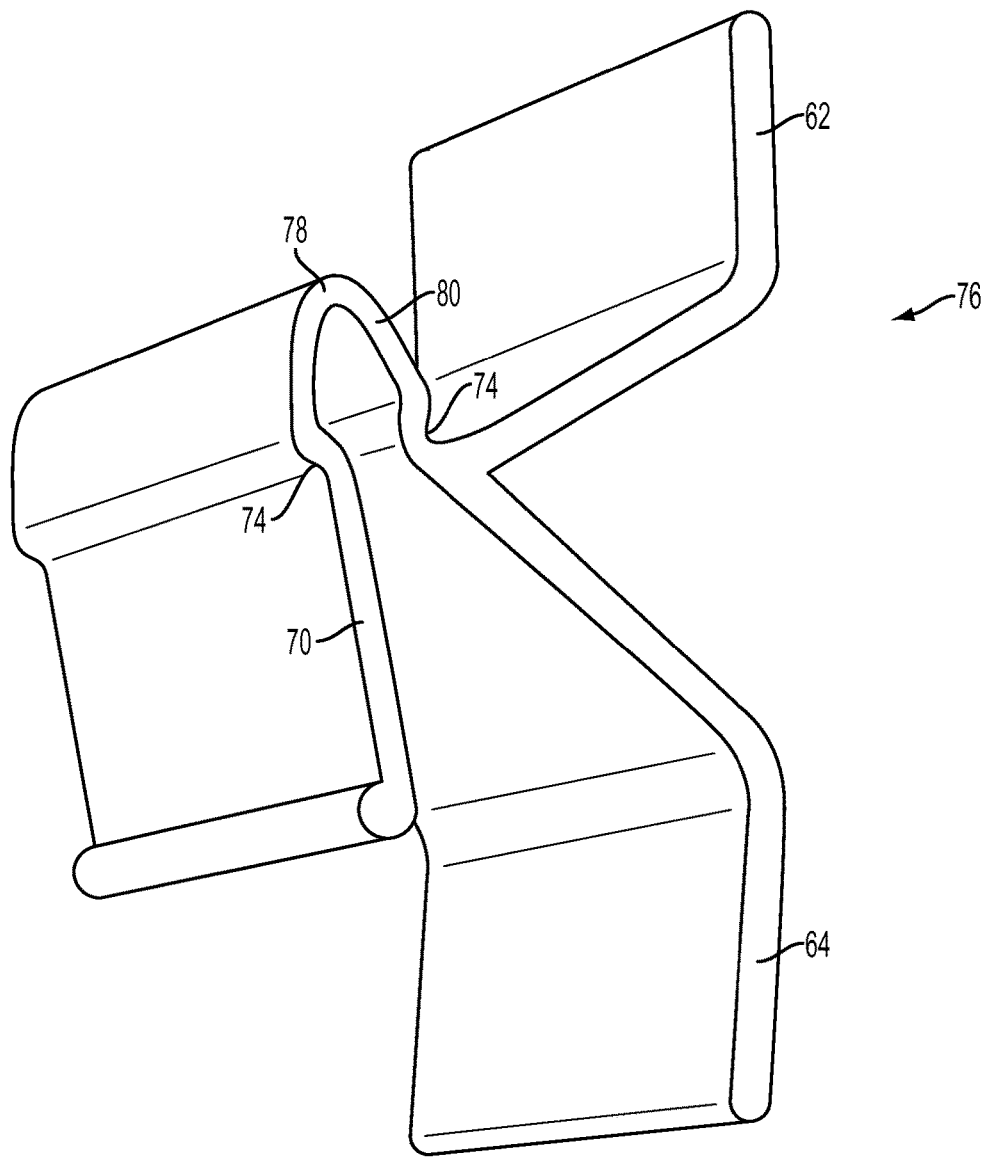
FIG. 11 is a perspective view of an alternative embodiment of a clip.

In another embodiment of a clip seen in FIG. 11, the clip 76 is similar to the clip 60 previously described. The clip 76 generally differs from the clip 60 previously described, in that the clip 76 is rounded at the first end 78 of the channel end 80. The round shape of the first end 78 of the channel end 80 promotes ease of insertion because if any part of the first end is between the constrictions 24, the round shape of the first end will self-center the channel end.

Figure 12:
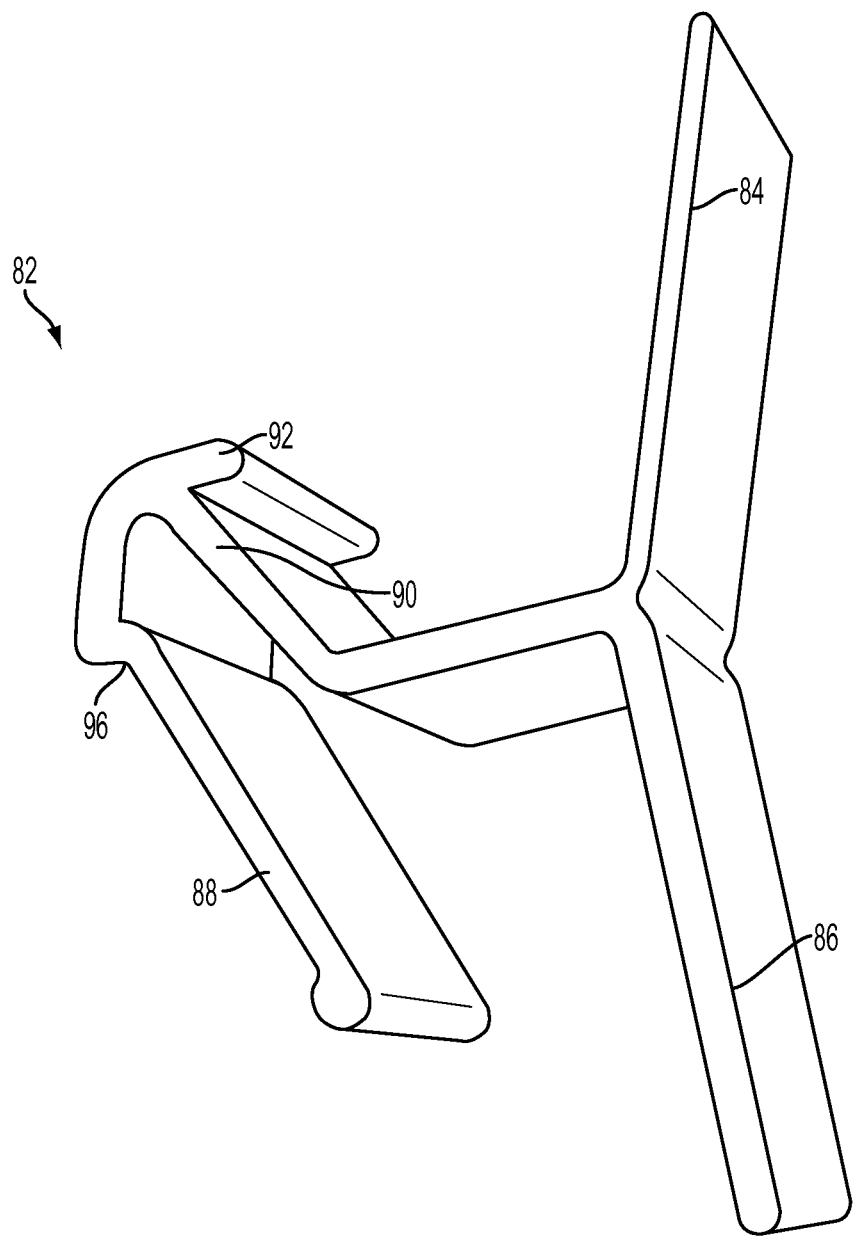
FIG. 12 is a perspective view of an alternative embodiment of a clip.
Figure 13:
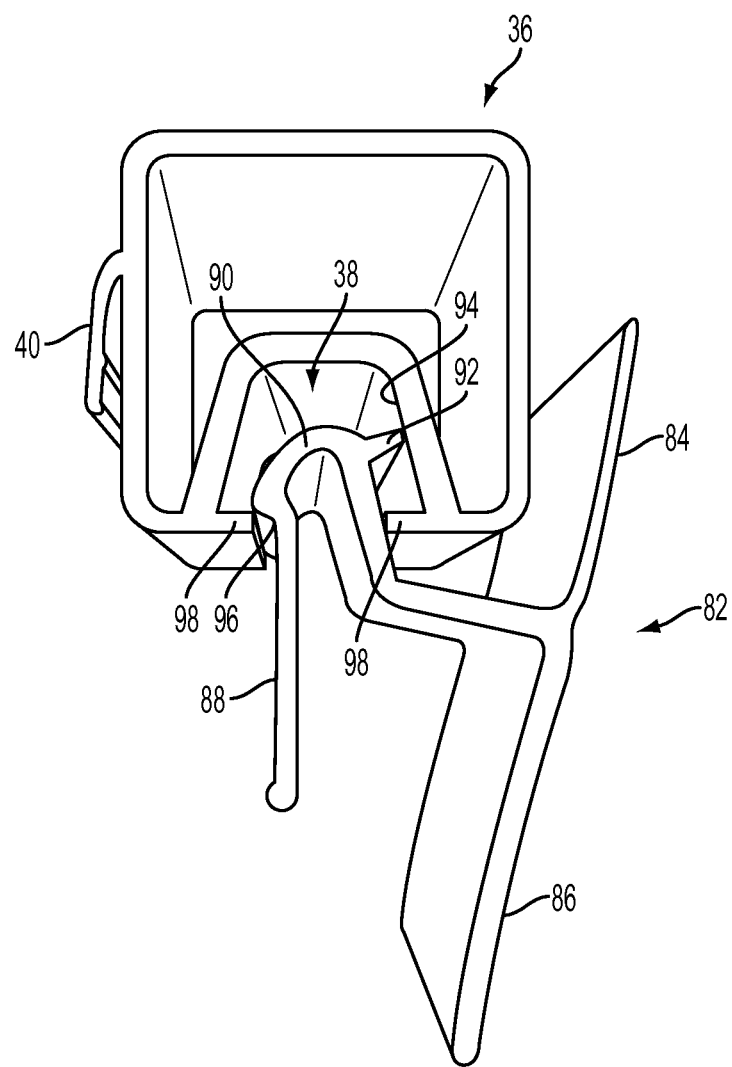
FIG. 13 is a perspective view of the clip of FIG. 12 engaged in a rail.

FIG. 12 shows another embodiment of a clip 82, which has a first and second flag 84, 86, an arm 88 and a channel end 90. The channel end 90 includes a locator 92. As seen in FIG. 13, when the clip 82 is inserted into the channel 38, the locator 92 is sized and positioned such that it helps ensure that the channel end 90 is properly positioned within the channel by spacing the channel end a distance equal to the size of the locator away from a channel wall 94. The proper spacing ensures that the recess 96 is engaged with one of the constrictions 98. When a cover material is attached to either or both of the first and second flags 84, 86 and the cover becomes taught, the cover material will pull the first flag towards the mid-rail 36, which will cause the channel end 90 to rotate counterclockwise. This rotation causes the recess 96 to better engage with one of the constrictions 98, thereby providing better retention of the clip 82.

Figure 14:
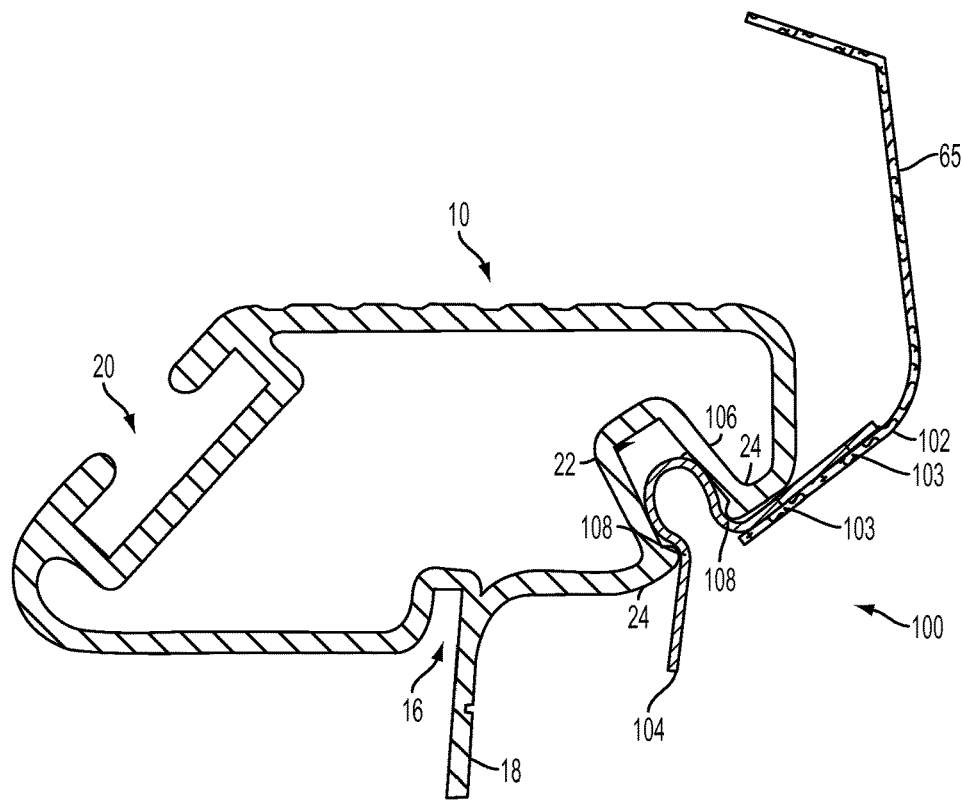
FIG. 14 is a cross-sectional view of an alternative embodiment of a clip engaged in a rail.
Figure 15:
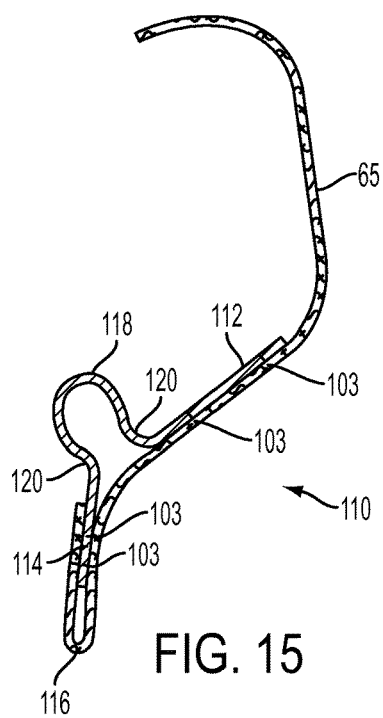
FIG. 15 is a cross-sectional view of an alternative embodiment of a clip connected to a cover.
Figure 16:
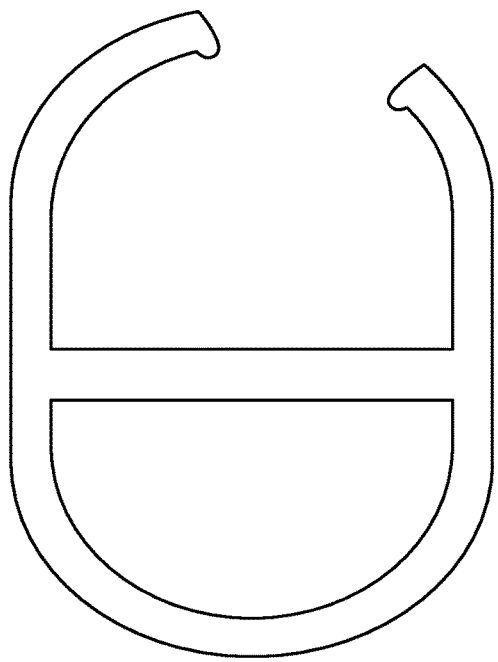
FIG. 16 is an end elevation view of an alternative embodiment of a rail.
Figure 17:
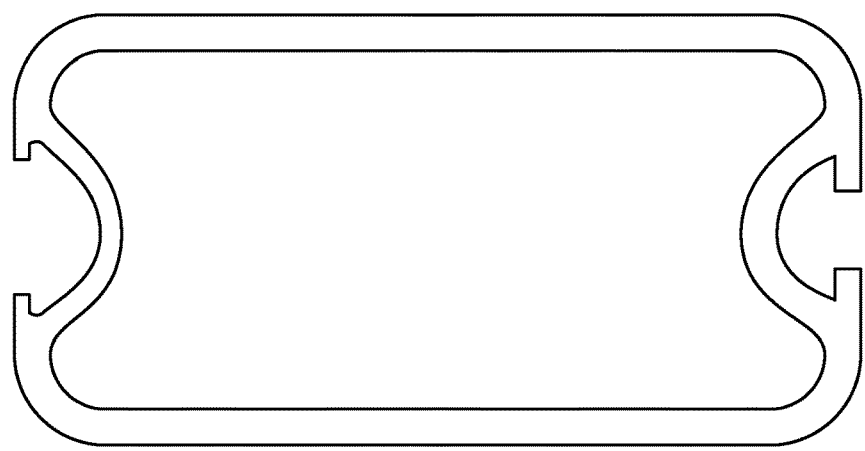
FIG. 17 is an end elevation view of an alternative embodiment of a rail.
Figure 18:
FIG. 18 is a perspective view of an alternative embodiment of a clip.
Figure 19:
FIG. 19 is a perspective view of an alternative embodiment of a clip.
Figure 20:
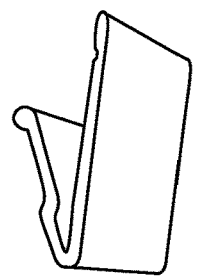
FIG. 20 is a perspective view of an alternative embodiment of a clip.
Figure 21:
FIG. 21 is a perspective view of an alternative embodiment of a clip.
Figure 22:
FIG. 22 is a perspective view of an alternative embodiment of a clip.
Figure 23:
FIG. 23 is a perspective view of an alternative embodiment of a clip.
Figure 24:
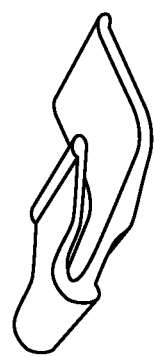
FIG. 24 is a perspective view of an alternative embodiment of a clip.
Figure 25:
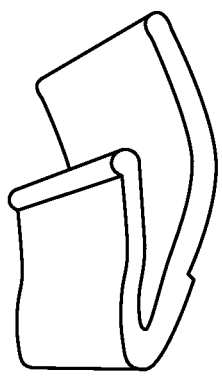
FIG. 25 is a perspective view of an alternative embodiment of a clip.
Figure 26:
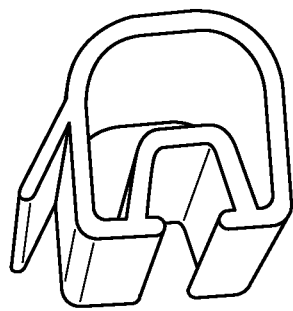
FIG. 26 is a perspective view of a portion of an alternative embodiment of a rail.
Figure 27:
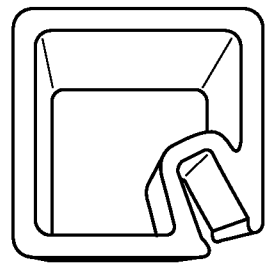
FIG. 27 is a perspective view of a portion of an alternative embodiment of a rail.

In another embodiment of a clip, which is shown in FIG. 14, the clip 100 has a flag 102 which is used to attach the clip to a cover material 65, such as, for example by stitching 103, an arm 104 and a round channel end 106 behind which reside recesses 108. In an alternative embodiment, the clip 100 is attached to the cover material 65 at the flag 112 and arm 114, as seen in FIG. 15. By allowing extra cover material at the arm 114, a flap 116 is created that can be used to release the clip 110 from the exterior channel 22. When it is desired to remove the clip 110 from the exterior channel 22, the flap 116 can be pulled towards the flag 112 causing the channel end 118 to compress and the recesses 120 to disengage from the constrictions 24. Thereafter, the clip 110 can be withdrawn from the exterior channel 22.

A few clip and channel configurations have been described above. Additional clip and channel configurations can be seen in FIGS. 16-27. However, applicant's invention is not limited to just these configurations. The clip and rail configuration is amendable to many sizes and shapes. The clip can be configured such that it can be pinched into a compressed state and inserted, and when released expands into an available channel of a marine vehicle. As such, one cover clip configuration can be used to attach covers to a variety of existing channel shapes or a single existing channel. Further, a clip could be configured so as to be optimally engaged with a channel of new design. A clip can also be configured for a particular feature. For example, a clip can be made such that it clicks when properly installed, or must be pinched and rolled into the channel. A clip can also be incorporated into accessories such as beverage or tool holders or pockets. The clips described herein can also be used with channels made from a variety of materials including, but not limited to aluminum and plastic.

The above described clips can be used anywhere a rail, fence or extrusion with a channel can be mounted or incorporated. For example, a rail or fence could be mounted to the side rails, Bimini rails, roof poles or deck edge of a pontoon boat or a channel could be added to an existing extrusion such as the rub rail of a fiberglass boat.

Many rub rails used today in the fiberglass boat industry are made from aluminum extrusions. Such aluminum extruded rub rails can be modified to add a channel like those described above. As such, the above described clips could then be used with fiberglass boats without having to drill holes in the fiberglass to add an after-market rail or snaps.

Modifying the rub rail on fiberglass boats would also eliminate the time and expense of having to drill holes for the metal snaps and the possibility of cracking the fiberglass during such drilling. The removal of metal snaps enhances the appearance of the boat so that the smooth fiberglass surface is not interrupted by metal boat snaps. Further, the ability to move the above described cover clips along the rub rail around the boat, allows boat owners to be able to use a wider variety of covers and cover manufacturers to make covers that fit a wider variety of boats, including fiberglass boats. Covers also stretch a bit over time. If the snaps for a fiberglass boat are permanently located at holes drilled in the fiberglass, the snaps cannot be moved to account for the change in cover size. The inability to move the snaps can lead to an ill-fitting cover that is unsightly and/or does not cover the boat. Since the clips have no specific location in which they must attach to a channel, the clips can be inserted into the channel at any desired location.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A cover for a vehicle with a channel, the channel having an opening at least partially defined by constrictions, the cover comprising:
a cover material sized and shaped to shelter at least a portion of the vehicle; and
a plurality of clips attached to the cover material, each of the plurality of clips further comprising:
a first arm having a first end and a second end; and
a second arm having a first end and a second end, the first end of the second arm connected to the first end of the first arm;
wherein at least one of the plurality of clips is movable between a first position in which the second end of the first arm and the second end of the second arm of the at least one of the plurality of clips are contracted and a second position in which the second end of the first arm and the second end of the second arm are not contracted;
wherein when at least one of the plurality of clips is in the first position, the at least one of the plurality of clips can be inserted between the constrictions and into the channel; and
wherein when at least one of the plurality of clips is at least partially in the channel and in the second position, the at least one of the plurality of clips is secured within the channel by the constrictions;
wherein each of the plurality of clips is attached to the cover material by the first arm;
wherein the cover material exerts a force on the first arm in a first direction when the cover is attached to the vehicle; and
wherein each of the plurality of clips can be removed from the channel by exerting a force on the second arm generally in the first direction.

2. The cover of claim 1 further comprising a tab connected to the first arm, wherein at least one of the plurality of clips is attached to the cover material by the tab.

3. The cover of claim 2, wherein the cover material is attached to the tab by stitching.

4. The cover of claim 1, wherein when the force is applied to the first arm by the cover material, the first arm is moved in the first direction.

5. The cover of claim 1, wherein the cover material is attached to the second end of the second arm to form a handle.

6. The cover of claim 1, wherein the first direction is a direction away from the second arm.

7. The cover of claim 1 wherein each of the plurality of clips is also attached to the cover material by the second arm.

8. The cover of claim 1, further comprising a first recess formed in the first arm adjacent the first end of the first arm and a second recess formed in the second arm adjacent the first end of the second arm.

9. The cover of claim 8, wherein the first recess is configured to engage one of the constrictions and the second recess is configured to engage one of the constrictions.

10. The cover of claim 1, wherein the connection between the first arm and the second arm is rounded in shape.

11. A fastener attached to a sheet of material comprising:
a first arm having a first end and second end; and
a second arm having a first end and a second end, the first end of the second arm connected to the first end of the first arm to form an engagement section of the fastener;
wherein the second end of the first arm and the second end of the second arm are movable from a base position to a pinched position so as to reshape the engagement section for insertion into a channel of a vehicle; and wherein the second end of the first arm is configured to be attached to the sheet of material such that when tension is applied to the second end of the first arm by the sheet of material, the second end of the first arm is pulled away from the second end of the second arm.

12. The fastener of claim 11, further comprising a leg extending from the first arm.

13. The fastener of claim 12, further comprising a flag extending from the leg, wherein the flag is configured to attach the fastener to the sheet of material.

14. The fastener of claim 13, wherein the flag extends generally perpendicular from the leg.

15. The fastener of claim 14, wherein the flag is generally parallel to the first arm.

16. The fastener of claim 12, wherein the leg extends generally perpendicular to the first arm.

17. The fastener of claim 12, wherein a space is formed between a portion of the leg and the first arm and wherein the space is configured to receive a rail of a boat when the fastener is connected to the boat.

18. The fastener of claim 11, wherein a distance between the second end of the first arm and the second end of the second arm in the base position is less than a distance between the second end of the first arm and the second end of the second arm when tension is applied to the second end of the first arm by the sheet of material.

19. A cover for a vehicle with a channel, the channel having an opening at least partially defined by constrictions, the cover comprising:
   a cover material sized and shaped to shelter at least a portion of the vehicle; and
   a plurality of clips attached to the cover material, each of the plurality of clips further comprising:
      a first arm having a first end and a second end; and
      a second arm having a first end and a second end, the first end of the second arm connected to the first end of the first arm;
   wherein at least one of the plurality of clips is movable between a first position in which the second end of the first arm and the second end of the second arm of the at least one of the plurality of clips are contracted and a second position in which the second end of the first arm and the second end of the second arm are not contracted;
   wherein when at least one of the plurality of clips is in the first position, the at least one of the plurality of clips can be inserted between the constrictions and into the channel; and
   wherein when at least one of the plurality of clips is at least partially in the channel and in the second position, the at least one of the plurality of clips is secured within the channel by the constrictions;
   wherein each of the plurality of clips is attached to the cover material by the first arm;
   wherein the cover material exerts a force on the first arm in a first direction when the cover is attached to the vehicle; and
   wherein each of the plurality of clips are configured to be removed from the channel when a force is exerted on the first arm generally in a direction opposite of the first direction.

20. The cover of claim 19 further comprising a tab connected to the first arm, wherein at least one of the plurality of clips is attached to the cover material by the tab.

21. The cover of claim 20, wherein the cover material is attached to the tab by stitching.

22. The cover of claim 21, wherein the cover material includes a flap.

23. The cover of claim 22, wherein the flap is formed by the cover material.

24. The cover of claim 23, wherein the flap is configured such that a force is exerted on the first arm generally in a direction opposite of the first direction when a force is exerted on the flap generally in a direction opposite of the first direction.

25. The cover of claim 24 wherein the flap is configured such that when the flap is moved in a direction generally opposite of the first direction, the first arm of at least some of the plurality of clips is moved generally in a direction opposite of the first direction and the some of the plurality of clips can be removed from the channel.

26. The cover of claim 23 wherein when the flap is moved in a direction generally in a direction opposite of the first direction, the second end of the first arm is moved closed to the second end of the second arm.

27. The cover of claim 19, wherein when the force is applied to the first arm by the cover material, the second end of the first arm is moved further away from the second end of the second arm.

28. The cover of claim 19, wherein the first direction is in a direction away from the second arm.

* * * * *